United States Patent [19]
Minakuchi et al.

[11] Patent Number: 5,838,001
[45] Date of Patent: Nov. 17, 1998

[54] SCANNING OPTICAL DEVICE AND POLYGON MIRROR COVER

[75] Inventors: Tadashi Minakuchi; Masahiro Oono; Mitsunori Iima; Hiroshi Kanazawa, all of Tokyo, Japan

[73] Assignee: Asahi Kogaku Kogyo Kabushiki Kaisha, Tokyo, Japan

[21] Appl. No.: 791,964

[22] Filed: Jan. 31, 1997

[30] Foreign Application Priority Data

Jan. 31, 1996 [JP] Japan .................................. 8-037266
Feb. 2, 1996 [JP] Japan .................................. 8-040604

[51] Int. Cl.$^6$ ...................................................... H01J 3/14
[52] U.S. Cl. ........................... 250/236; 359/212; 359/216
[58] Field of Search ..................................... 250/234–236, 250/216; 359/212, 216–219; 354/474, 494

[56] References Cited

U.S. PATENT DOCUMENTS

| | | | |
|---|---|---|---|
| 4,796,963 | 1/1989 | Yoshimura | 358/206 |
| 4,826,271 | 5/1989 | Takahashi et al. | 350/6.8 |
| 4,967,076 | 10/1990 | Schuhmacher et al. | 250/236 |
| 5,089,081 | 2/1992 | Bedzyk | 359/216 |
| 5,179,271 | 1/1993 | Lindacher et al. | 359/219 |
| 5,671,081 | 9/1997 | Hisa | 359/216 |
| 5,675,431 | 10/1997 | Bock | 359/216 |

FOREIGN PATENT DOCUMENTS

2-198413 8/1990 Japan .
2-240617 9/1990 Japan .
2-140510 11/1990 Japan .

*Primary Examiner*—Stephone B. Allen
*Attorney, Agent, or Firm*—Greenblum & Bernstein, P.L.C.

[57] ABSTRACT

A scanning optical device that includes a light source for emitting a light flux; a polygon mirror including a plurality of reflecting surfaces for deflecting the light flux to form a scanning beam spot on an image surface; a polygon mirror cover that covers the polygon mirror; and an optical sensor. The polygon mirror is provided with a mark on the top surface thereof that is eccentric from a rotation axis of the polygon mirror. Also, the polygon mirror cover includes a cylindrical rib formed on an inner surface of the top wall projecting toward the polygon mirror in a space between the top wall and the polygon mirror. The optical sensor is provided for detecting the mark and projects toward the polygon mirror from the inner surface of the top wall, through the cylindrical rib, such that the optical sensor forms a part of the cylindrical rib.

9 Claims, 7 Drawing Sheets

SCANNING OPTICAL DEVICE AND POLYGON MIRROR COVER

BACKGROUND OF THE INVENTION

The present invention relates to a scanning optical device used for a laser beam printer or the like. In particular, the present invention relates to such a scanning optical device that uses a polygon mirror as a deflector.

A scanning optical device includes a laser source such as a semiconductor laser, a polygon mirror for deflecting a laser flux emitted from the laser source, and an fθ lens that converges the laser flux onto an image surface such as a photoconductive drum to form scanning lines.

A plurality of reflecting surfaces of a metal polygon mirror are individually polished. Thus, each of the plurality of reflecting surfaces may have individual errors. In order to compensate for the errors of each individual surface, a detection device is required for identifying which reflecting surface is currently used for scanning. Typically a detection device, such as an optical sensor, is mounted on a polygon mirror cover that covers the rotating polygon mirror. The top surface of the polygon mirror is provided with a mark, which has different reflectivity from the other portions of the top surface of the polygon mirror, such that the optical sensor is positioned to detect the mark.

Further, in order to provide accurate detection in a low light environment, the distance from the sensor to the polygon mirror is made as small as possible. Thus, the sensor is disposed so as to protrude as close as possible towards the polygon mirror from the inner face of the polygon mirror cover.

However, if the sensor protrudes into the space under the polygon mirror cover, the space within the polygon mirror cover will be asymmetrical and the flow of air that is generated within the space due to the rotation of the polygon mirror will become turbulent. If the flow of air is turbulent, the polygon mirror may rotate unevenly or vibrate.

SUMMARY OF THE INVENTION

It is therefore an object of the present invention to provide a scanning optical device in which the uneven rotation or vibration of the polygon mirror is minimized, even if a sensor protrudes into the space under the polygon mirror cover.

According to an aspect of the present invention, there is provided a scanning optical device that includes a light source for emitting a light flux; a polygon mirror including a plurality of reflecting surfaces for deflecting the light flux to form a scanning beam spot on an image surface; a polygon mirror cover that covers the polygon mirror; and a sensor.

Further, the polygon mirror is provided with a mark on the top surface thereof that is eccentric from a rotation axis of the polygon mirror. Also, the polygon mirror includes a cylindrical wall that surrounds the reflecting surfaces of the polygon mirror; a top wall that is provided at one open end of the cylindrical wall; and a cylindrical rib having a smaller diameter than the cylindrical wall formed on an inner surface of the top wall projecting toward the polygon mirror in a space between the top wall and the polygon mirror. The optical sensor is provided for detecting the mark and projects toward the polygon mirror from the inner surface of the top wall, through the cylindrical rib, such that the optical sensor forms a part of the cylindrical rib.

The provision of the cylindrical rib and the fitting of the optical sensor with the rib lessens the possibility that the air flow (caused by the rotation of the polygon mirror) within the polygon mirror cover will become turbulent and disrupt the rotation of the polygon mirror.

In a particular case, the cylindrical wall is formed with a light path hole which transmits the light flux incident on and reflected from the polygon mirror. Preferably, a cover glass plate is fitted in the light path hole. The provision of the cover glass plate also facilitates air flow within the polygon mirror cover.

Also preferably, the cover glass plate is tilted at a predetermined angle in an auxiliary scanning direction with respect to the axis of the incident light flux. If the cover glass plate is tilted in this way, any light flux-reflected by the cover glass plate will be directed away from the optical path of the scanning optical device.

In a particular case, the scanning optical device may further include a dynamic prism that is disposed between the light source and the polygon mirror and a driving mechanism that moves the dynamic prism to change the angle of the dynamic prism to control the position of the beam spot on the image surface during scanning. In this case, the output of the optical sensor can be used to control the driving mechanism.

In a further particular case, the scanning optical device may further include a scanning lens disposed between the polygon mirror and the image surface to converge the light flux deflected by the polygon mirror.

In a still further particular case, the light source may be arranged to emit a plurality of light fluxes.

According to another aspect, there is provided a polygon mirror cover having a cup shape and, in particular, the cover includes; a cylindrical side wall portion for surrounding a plurality of reflecting surfaces of a polygon mirror, wherein an optical path hole is formed on the side wall portion; a flat top wall portion for covering one opening of the side wall portion, wherein a sensor hole is formed away from a rotation axis of the polygon mirror; and a cylindrical rib that is formed on the inner surface of the top wall portion to project toward the polygon mirror such that an optical sensor inserted to the sensor hole is essentially flush with the cylindrical rib.

As above, the provision of the cylindrical rib for insertion of the optical sensor lessens the possibility that the air flow (caused by the rotation of the polygon mirror) within the polygon mirror cover will become turbulent due to the rotation of the polygon mirror.

DETAILED DESCRIPTION OF THE PREFERRED EMBODIMENTS

A scanning optical device according to the present embodiment is described with reference to FIGS. 1 through 8. The embodiment described is directed to a multi-beam scanning optical device that scans a plurality of laser fluxes across a predetermined angle producing eight scanning lines per scan on a surface, such as the surface of a photoconductive member.

Figure 1:
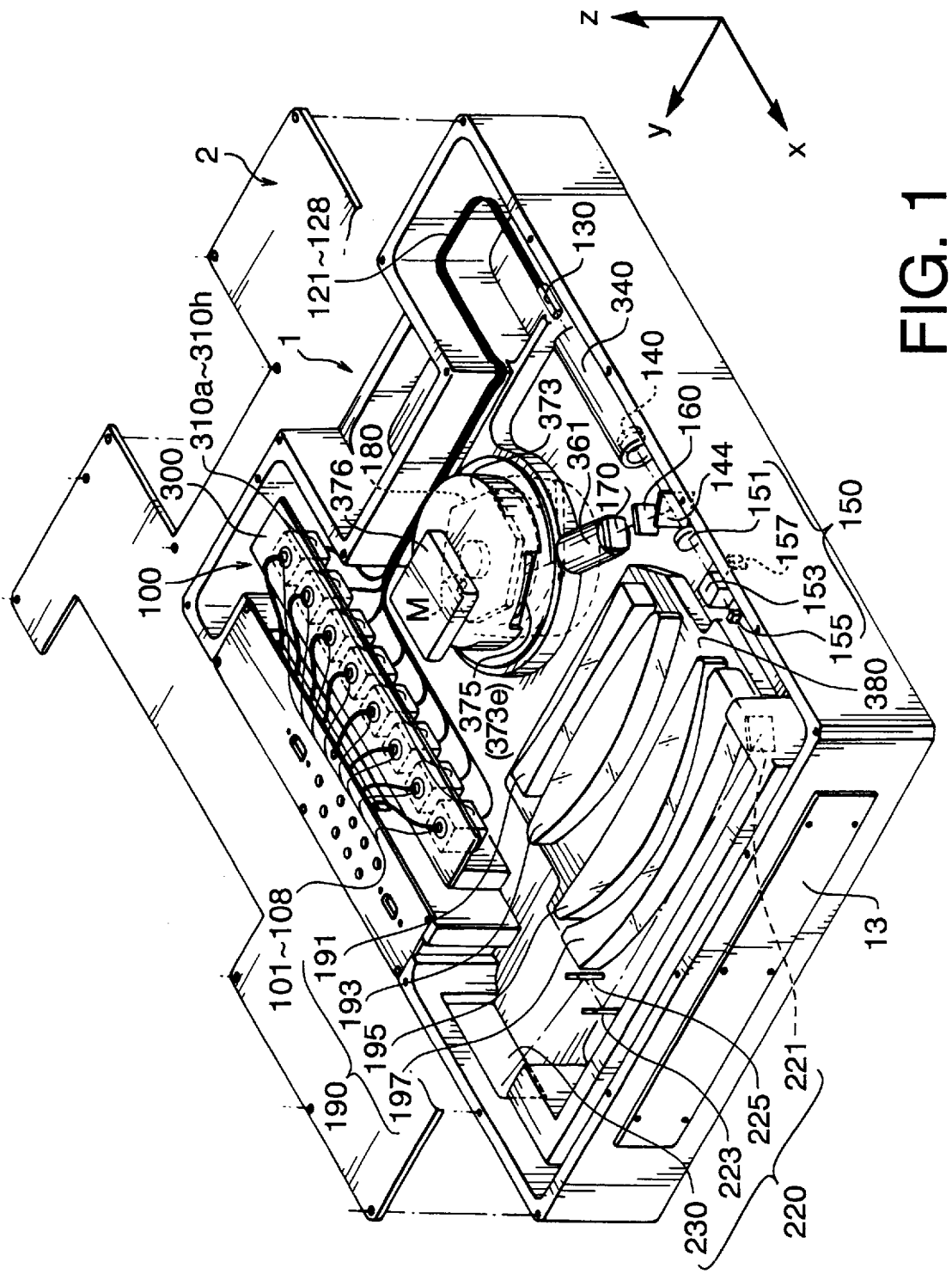
FIG. 1 is a perspective view showing a scanning optical device.
Figure 2:
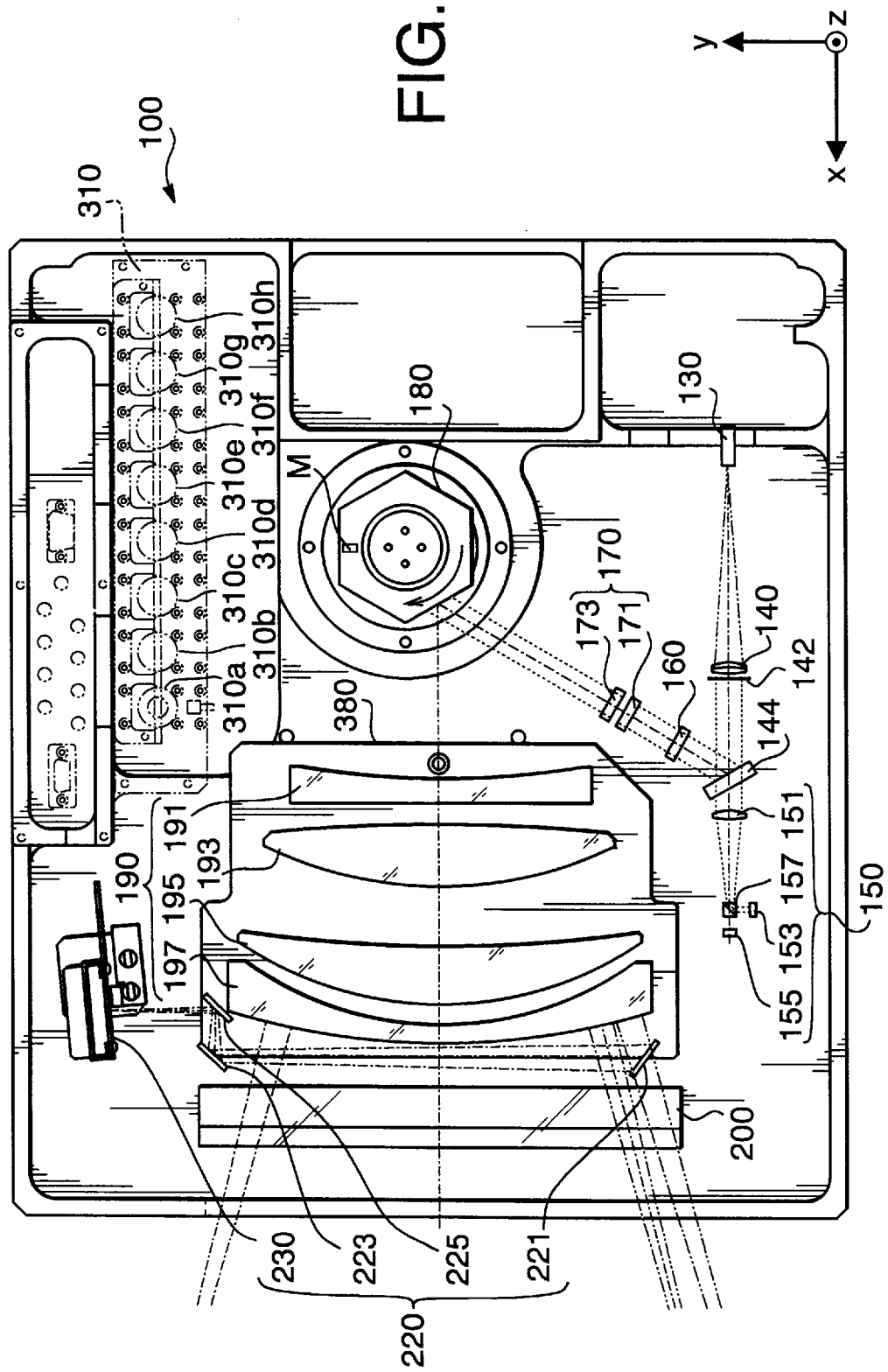
FIG. 2 is a plan view of the scanning optical device shown in FIG. 1 in a main scanning direction.

The structure of the scanning optical device is first described with reference to FIGS. 1 to 4. FIG. 1 shows a perspective view of the scanning optical device, FIG. 2 shows a plan view thereof, FIG. 3 shows a cross-sectional view thereof, and FIG. 4 shows an optical configuration of the scanning optical device.

Figure 3:
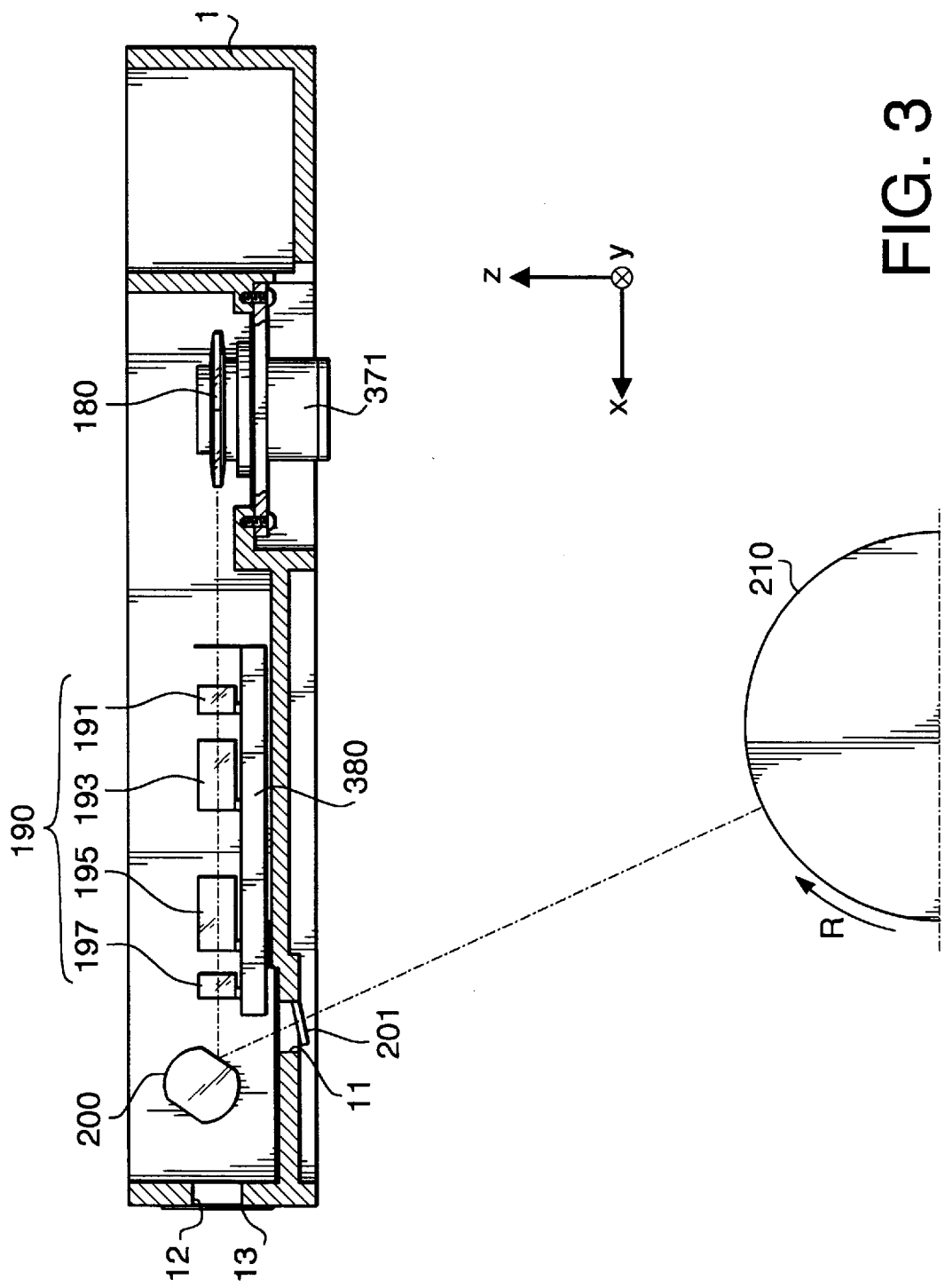
FIG. 3 is a cross-sectional view of the scanning optical device shown in FIG. 1 in an auxiliary scanning direction.
Figure 4:
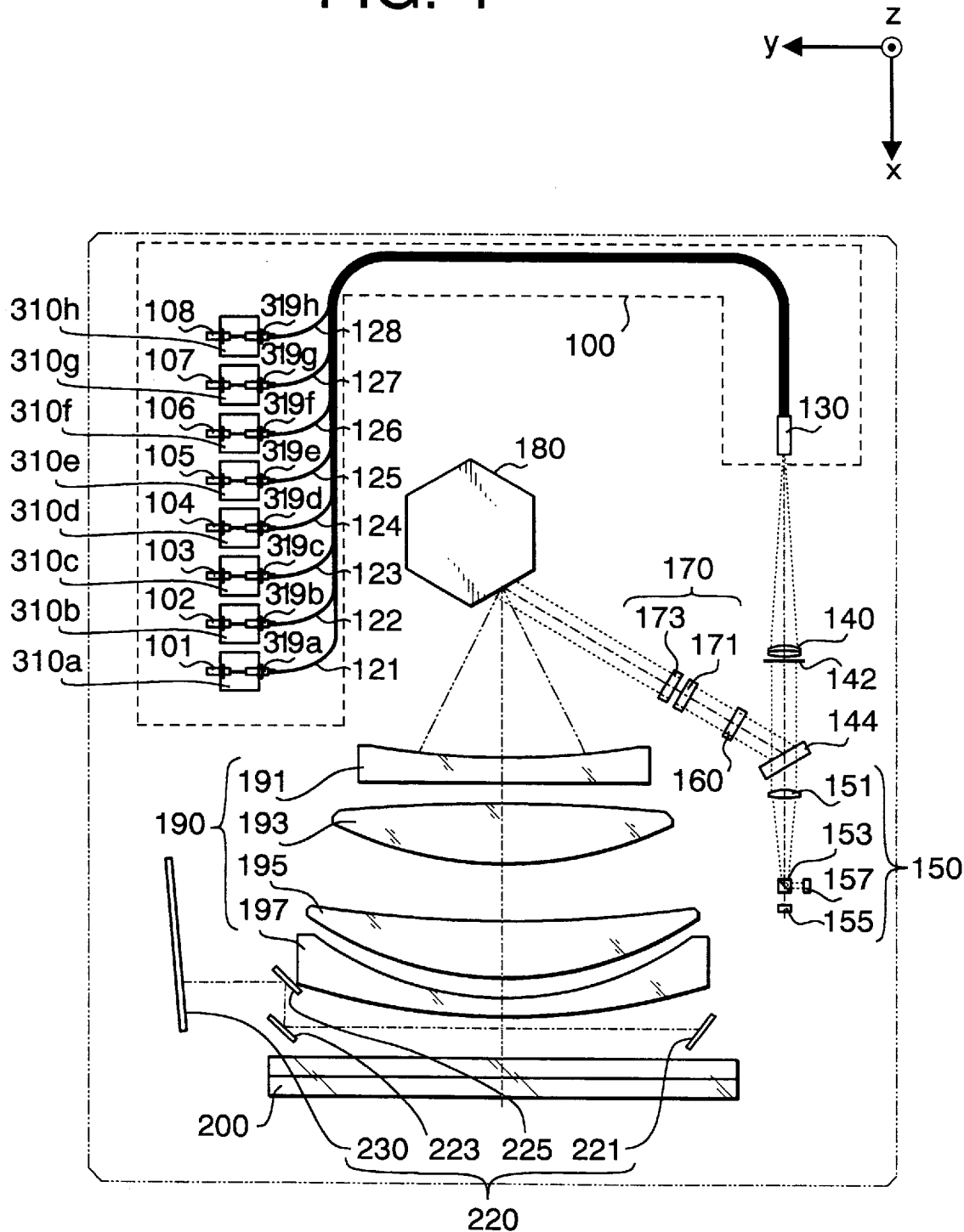
FIG. 4 shows the optical configuration of the scanning optical device of FIG. 1 in the main scanning direction.

As shown in FIGS. 3 and 4, the scanning optical device comprises a light transmission device 100, a polygon mirror 180, and an fθ lens 190 (scanning lens). In operation, eight laser fluxes are emitted from the light transmission device 100, deflected (scanned) by the polygon mirror 180, pass through the fθ lens 190, to form eight scanning lines on a photoconductive surface, such as a photoconductive drum 210.

Throughout this specification, a "main scanning direction" is defined as a direction in which a laser flux scans across the surface of a photoconductive member, and an "auxiliary scanning directions" is a direction in which the photoconductive member is translated or rotated to position the member for a subsequent main scan. The main scanning and auxiliary scanning directions are perpendicular to one another, and are both perpendicular to the optical axes of lenses guiding the laser fluxes. Since a laser flux typically is reflected or "folded" several times in the transmission from the light source to a photoconductive member, the main scanning and auxiliary scanning directions are not absolute, but are generally referred to with reference to the optical axis at a particular point along the optical path.

In this specification, an XYZ coordinate system is defined in each of FIGS. 1 through 4. The X axis is an axis parallel to the optical axis of the fθ lens 190, and the Y and Z axes are orthogonal to each other in the plane perpendicular to the X axis. The Y axis is parallel with the main scanning direction, and the Z axis is parallel with the auxiliary scanning direction.

As shown in FIG. 1, the scanning optical device further includes an open casing 1. In use, the top opening of the casing 1 is closed by an upper cover lid 2.

As shown in FIG. 4, the light transmission device 100 includes eight semiconductor lasers 101 through 108; eight laser blocks 310a through 310h (each attached to a supporting substrate 300), corresponding to each of the lasers 101 through 108; eight silica glass optical fibers 121 through 128, also corresponding to each of the lasers 101 through 108; and a fiber alignment block 130. Each of the lasers 101 through 108 is mounted in the corresponding laser block 310a through 310h such that the respective laser fluxes are guided to enter the corresponding optical fibers 121 through 128. Furthermore, the incident end portions of the optical fibers 121 through 128 are retained by fiber supporting members 319a through 319h fixed at the laser blocks 310a through 310h, respectively. The fiber alignment block 130 secures the exit end portions of the optical fibers 121 through 128 for aligning the eight optical fibers 121 through 128 such that eight point light sources are formed in a straight line.

A diverging light flux emitted from the fiber alignment block 130 is collimated by a collimator lens 140 held by a cylindrical collimator lens barrel 340, and is directed through an aperture 142. The aperture 142 defines a rectangular opening, longer in the main scanning direction, designed to regulate the beam shape (in the main scanning and auxiliary scanning directions) of the light flux emitted from the collimate lens 140.

The light flux that passes through the aperture 142 is directed to a beam splitter 144. The beam splitter 144 splits the light flux causing a part of the light flux to be transmitted as a monitor light flux and the remaining part to be reflected as a main light flux. The transmissivity of the beam splitter 144 (i.e., the amount of light transmitted as a monitor flux) is, for example, from 5 to 10 percent as a mean value of S polarized light and P polarized light.

The monitor light flux is directed into an automatic power control (APC) sensor system 150. The APC sensor system 150 includes a collective lens 151 for converging the monitor flux; a polarization beam splitter 153 which splits the light flux into two linear polarization components that are orthogonal to each other; a first APC light receiving element 155; and a second APC light receiving element 157.

The first and second APC light receiving elements 155 and 157 detect the light energy of the respective linear polarization components, and the output of the light receiving elements 155 and 157 is used for a feedback control of the output of the semiconductor lasers 101 through 108.

The main light flux reflected by the beam splitter 144 is transmitted through a dynamic prism 160. The dynamic prism 160 is rotatably disposed about an axis orthogonal to the optical axis to control the spot position in the auxiliary scanning direction on the image plane. That is, the dynamic prism 160 is preferably a wedge prism, supported to be rotatable about the main scanning direction in order to deviate the direction of the flux in the auxiliary scanning direction. The dynamic prism 160 corrects changes in the position of image spots (in the auxiliary scanning direction) on the scanning plane resulting from either or both of tilting error of the reflecting surfaces of the polygon mirror 180 and unevenness of rotation of a photoconductive drum 210 (shown in FIG. 3, and described later).

The main light flux transmitted through the dynamic prism 160 forms a linear image in the vicinity of the mirror surface of the polygonal mirror 180 by means of a cylindrical lens 170. The cylindrical lens 170 has positive power only in the auxiliary scanning direction. As shown in FIG. 1 and 2, the cylindrical lens 170 is supported by a cylindrical lens barrel 361 and is composed of two lenses 171, 173 having positive and negative power, respectively, in the auxiliary scanning direction.

As shown in FIG. 3, the polygonal mirror 180 is driven by a mirror motor 371 (fixed in the casing 1), and rotates clockwise from the viewpoint of FIG. 2 (shown by an arrow). Furthermore, as shown in FIG. 1, the polygonal mirror 180 is isolated from the atmosphere by a cup-like polygon cover 373 in order to prevent the generation of sound due to rotations, and to avoid damage to the mirror surface from collisions with dust or debris in the air.

An optical path opening 373e is formed at the side of the polygon cover 373, and a cover glass 375 is fitted in the optical path opening 373e. The main flux transmitted through the cylindrical lens 170 enters the polygon cover 373 through the cover glass 375, is deflected by the polygonal mirror 180, and is directed outward, passing again through the cover glass 375. Furthermore, a mark M is attached to or marked on the top surface of the polygonal mirror 180 and a sensor block 376 containing a sensor for detecting the mark M is provided on the top surface of the polygon cover 373.

A polygonal mirror may have facial errors (shape errors) on the reflection surfaces that are produced during manufacturing. This manufacturing error is often uneven between the respective reflection surfaces (i.e. between and among each side of the polygonal mirror). In order to compensate for these facial errors, the error quantity of each surface of the polygonal mirror 180 can be measured and stored in a memory (not shown) during the manufacture of the scanning optical device. Then, by distinguishing which reflection surface of the polygonal mirror 180 is currently being used for scanning, for example, according to the output of the sensor in the sensor block 376, at least the beam position and beam intensity may be corrected according to the error quantity inherent to each of the reflection surfaces of the polygonal mirror 180.

As shown in FIG. 3, the main flux reflected by the polygonal mirror 180 passes through the fθ lens 190 (an image forming optical system) and is reflected by a fold-over mirror 200 to the photoconductive drum 210, forming eight beam spots. The beam spots scan according to rotations of the polygonal mirror 180, forming eight scanning lines per scan on the photoconductive drum 210. The photoconductive drum 210 is driven and rotated in the direction of the arrow R in synchronization with the scanning of the beam spots, to form an electrostatic latent image on the photoconductive drum 210. The latent image is then transferred onto a sheet of paper (not shown) by a known electronic photography process.

The fθ lens 190 includes first, second, third and fourth lenses 191, 193, 195, 197 arranged in order from the polygonal mirror 180 side to the fold-over mirror 200 side, having negative, positive, positive and negative power in both the main scanning and auxiliary scanning directions, respectively. The first, second, third and fourth lenses 191, 193, 195, 197 are arranged on a lens base 380. The combination of first, second, third and fourth lenses 191, 193, 195, 197 in the fθ lens 190 operates such that the light flux that was linearly formed as an image in the auxiliary scanning direction at the polygonal mirror 180 is elliptically formed as an image on the photoconductive drum 210.

The first lens 191 of the fθ lens 190 is a negative lens having a concave spherical surface on the polygonal mirror 180 side, and a cylindrical surface having negative power only in the auxiliary scanning direction on the fold-over mirror 200 side. The surfaces of the lens are designed such that the first lens 191 has a comparatively large negative (i.e. more negative) power in the auxiliary scanning direction and a comparatively small negative power in the main scanning direction.

The second lens 193 of the fθ lens 190 is a meniscus-shaped toric lens having a convex-spherical surface on the polygonal mirror 480 side and a convex toric surface on the fold-over mirror 200 side. The surfaces of the lens are designed such that, the second lens 193 has a comparatively large positive (i.e. more positive) power in the auxiliary scanning direction and a comparatively small positive power in the main scanning direction.

The third lens 195 is a positive meniscus lens having two spherical surfaces.

The fourth lens 197 is a negative meniscus lens having two spherical surfaces.

The main flux transmitted through the fθ lens 190 is detected by a synchronization sensor system 220 at each scan (i.e. for each surface of the polygonal mirror 180). The synchronization sensor system 220 is positioned in the optical path between the fourth lens 197 of the fθ lens 190 and the fold-over mirror 200. The synchronization sensor system 220 includes first, second, and third mirrors 221, 223, 225, and a synchronization light sensor 230 which receives the light fluxes reflected by the mirrors 221, 223, 225. The first mirror 221 is positioned in the optical path from the polygonal mirror 180 to the fold-over mirror 200 at one edge of the main scanning range, but outside of a predetermined image forming range (not shown). The second and third mirrors 223 and 225 are positioned outside of the optical path on an opposite side to the first mirror 221. The synchronization light sensor 230 is disposed at a position optically equivalent to the position on the surface of the photoconductive drum 210 at which scanning occurs. Thus, in each main scan, the eight fluxes are sequentially reflected by the first, second, and third mirrors 221, 223, 225 and strike the synchronization light sensor 230. A signal or signals output by the synchronization light sensor 230 are then used to synchronize the transfer of image data equivalent to one scan from a drive circuit (not shown) to drive the semiconductor lasers 101 through 108 according to the image data.

An image forming opening 11, which permits the main flux (including the eight individual fluxes) reflected by the fold-over mirror 200 to be transmitted to the photoconductive drum 210, is formed in the casing 1. A cover glass 201 is attached to the image forming opening 11.

An inspection opening 12 is formed behind the fold-over mirror 200. The inspection opening 12 is used when adjusting optical elements after the optical elements (excluding the fold-over mirror 200) are assembled. As shown in FIG. 3, the inspection opening 12 is covered by a cover plate 13 in normal use.

Figure 5:
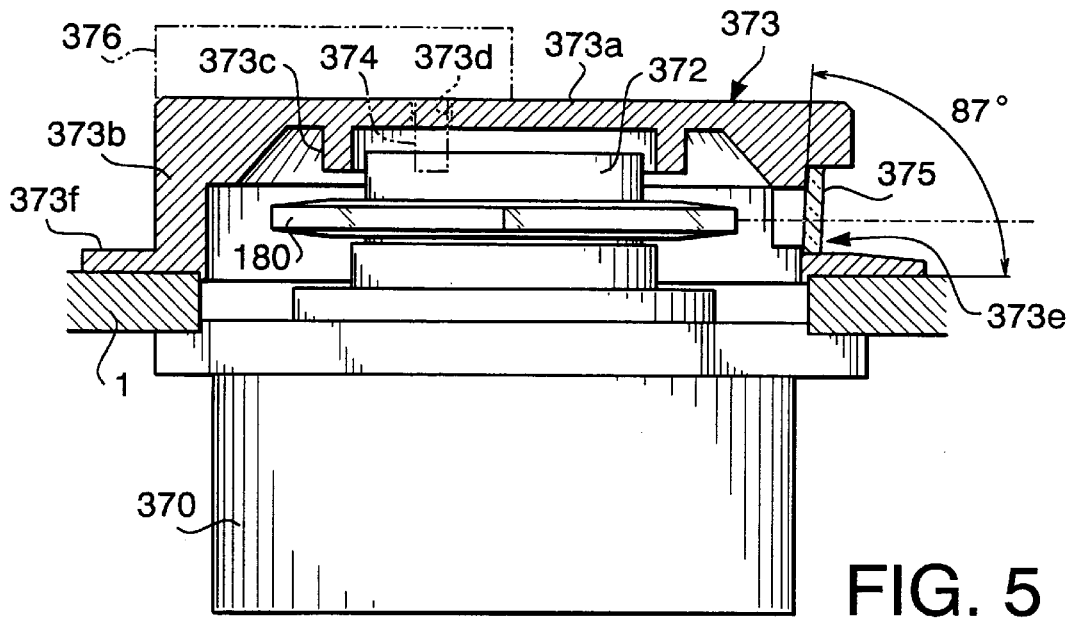
FIG. 5 is a cross section of a polygon mirror cover of the scanning optical device of FIG. 1.
Figure 6:
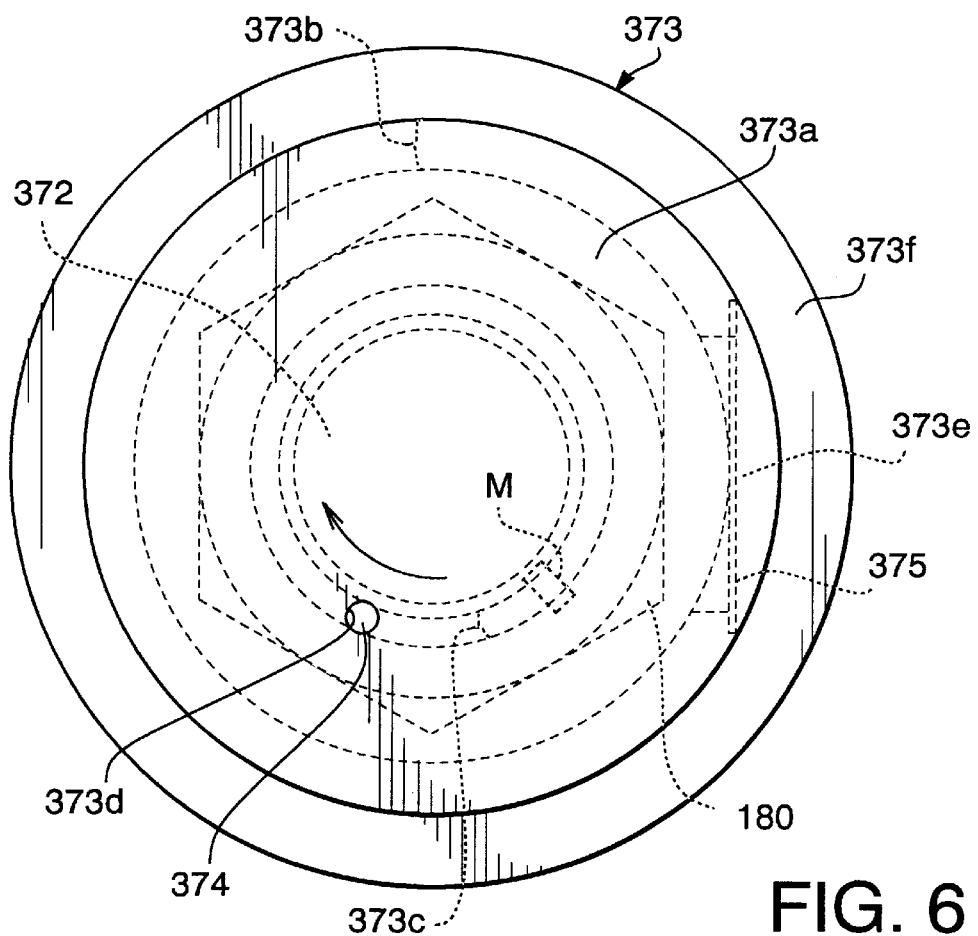
FIG. 6 is a plan view as viewed from an upper side of FIG. 5.
Figure 7:
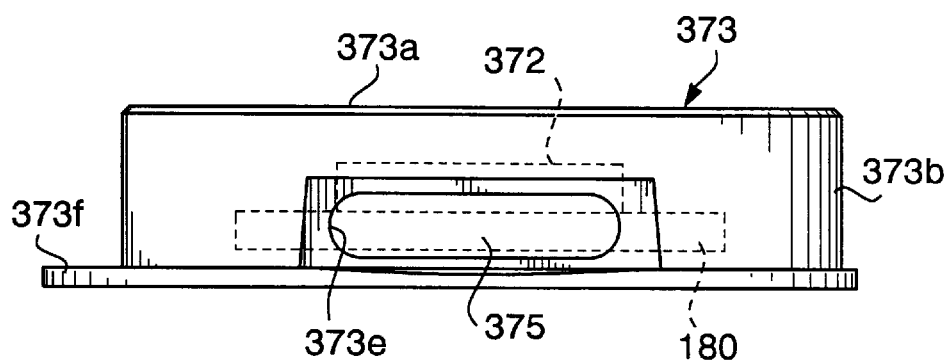
FIG. 7 is a front view as viewed from a cover glass side of FIG. 5.

The structure of the polygon mirror cover 373 is now described with reference to FIGS. 5 to 7. FIG. 5 is a cross section which shows an example arrangement of the polygon mirror cover 373, FIG. 6 is a top view of the arrangement of the polygon mirror cover 373 of FIG. 5, and FIG. 7 is a front view as viewed from the cover glass 375 side in FIG. 5.

As shown in FIG. 5, the polygon mirror 180 is directly mounted to a rotating shaft of a mirror motor 370 and is fixed to the rotating shaft by means of a cylindrical cap 372. The mirror motor 370 is fixed to the casing 1.

The polygon mirror cover 373 is formed as a cup-shape that includes a cylindrical side wall part 373b, which surrounds the outer periphery of the plurality of reflecting surfaces of the polygon mirror 180, and a top wall part 373a, which is attached to the upper part of side wall part 373b as a top for the polygon mirror cover 373. The lower end of the side wall part 373b is provided with a fixing flange part 373f, which extends outward. The polygon mirror cover 373 is mounted to casing 1 by fixing the fixing flange part 373f to the casing 1.

As was described above, the side wall part 373b is provided with a light path hole 373e which transmits the light flux incident on and reflected from the reflecting surfaces of the polygon mirror 180. The cover glass 375 is fitted in this light path hole 373e. In a particular example, the cover glass 375 is tilted at an angle of 87 degrees with respect to the casing 1 in the auxiliary scanning direction, in order to prevent the entry of light flux reflected from the cover glass 375 into the fθ lens 190.

A sensor hole 373d is formed on the top wall part 373a at a position that is eccentric with respect to the rotation axis of the polygon mirror 180. A polygon sensor 374 is inserted into the sensor hole 373d for detecting the mark M in a non-contacting manner. As shown by the phantom line (alternating long and two short dashes) in FIG. 5, the polygon sensor 374 is placed in the sensor mounting hole 373d such that the polygon sensor 374 protrudes towards but does not touch the polygon mirror 180. A ring-shaped rib 373c, which extends by substantially the same amount as the polygon sensor 374, is formed on the inner face of the top wall part 373a. The rib 373c is centered on the rotation axis of the polygon mirror 180 and has a diameter such that the rib 373c surrounds the cap 372. Further, the rib 373c is formed such that the thickness of the rib 373c(i.e. the distance between the inner and outer diameters of the cylindrical rib 373c) is substantially the same as the size of the sensor mounting hole 373d and the polygon sensor 374. The sensor mounting hole 373d is formed to pass through the top wall part 373a and through the rib 373c such that when the polygon sensor 374 is inserted in the sensor mounting hole 373d, the polygon sensor 374 is substantially flush with the rib 373c.

Since the polygon mirror 180 is fixed by means of the cap 372 in the above manner, a gap of a predetermined size is formed between the polygon mirror 180 and the top wall part 373a of the polygon mirror cover 373. Meanwhile, the polygon sensor 374 for detecting the mark M made on the polygon mirror 180 can perform detection in a lower light environment if the distance from the polygon sensor 374 to the polygon mirror 180 is shorter. Thus, the polygon sensor 374 is disposed so as to protrude as close as possible towards the polygon mirror 180 from the inner face of the top wall part 373a.

The rib 373c is required since, if only the polygon sensor 374 protrudes into the space under the polygon mirror cover 373, the space within the polygon mirror cover 373 will be asymmetrical and the flow of air that is generated within the space due to the rotation of the polygon mirror 180 will become turbulent. If the flow of air is turbulent, the polygon mirror 180 may rotate unevenly or vibrate.

Thus, in the present example, the rib 373c is formed on the inner face of the top wall part 373a to maintain the rotational symmetry of the space inside the polygon mirror cover 373. The rib 373c helps to reduce turbulence and thus prevent uneven rotation and vibration of the polygon mirror 180.

The polygon sensor 374 may include, for example, a light emitting diode, which projects light towards the polygon mirror 180, and a light receiving element, which receives the light that is reflected by the polygon mirror 180. In the present embodiment, the mark M is made with a black, oil-based ink that makes the reflectivity of the marked part lower than the other parts such that the output of the light receiving element drops temporarily each time the mark M passes below the polygon sensor 374. The polygon sensor 374 outputs an index signal at the time the mark M passes below the polygon sensor 374.

The arrangement of the control system of the scanning optical device will now be described with reference to FIG. 8.

Figure 8:
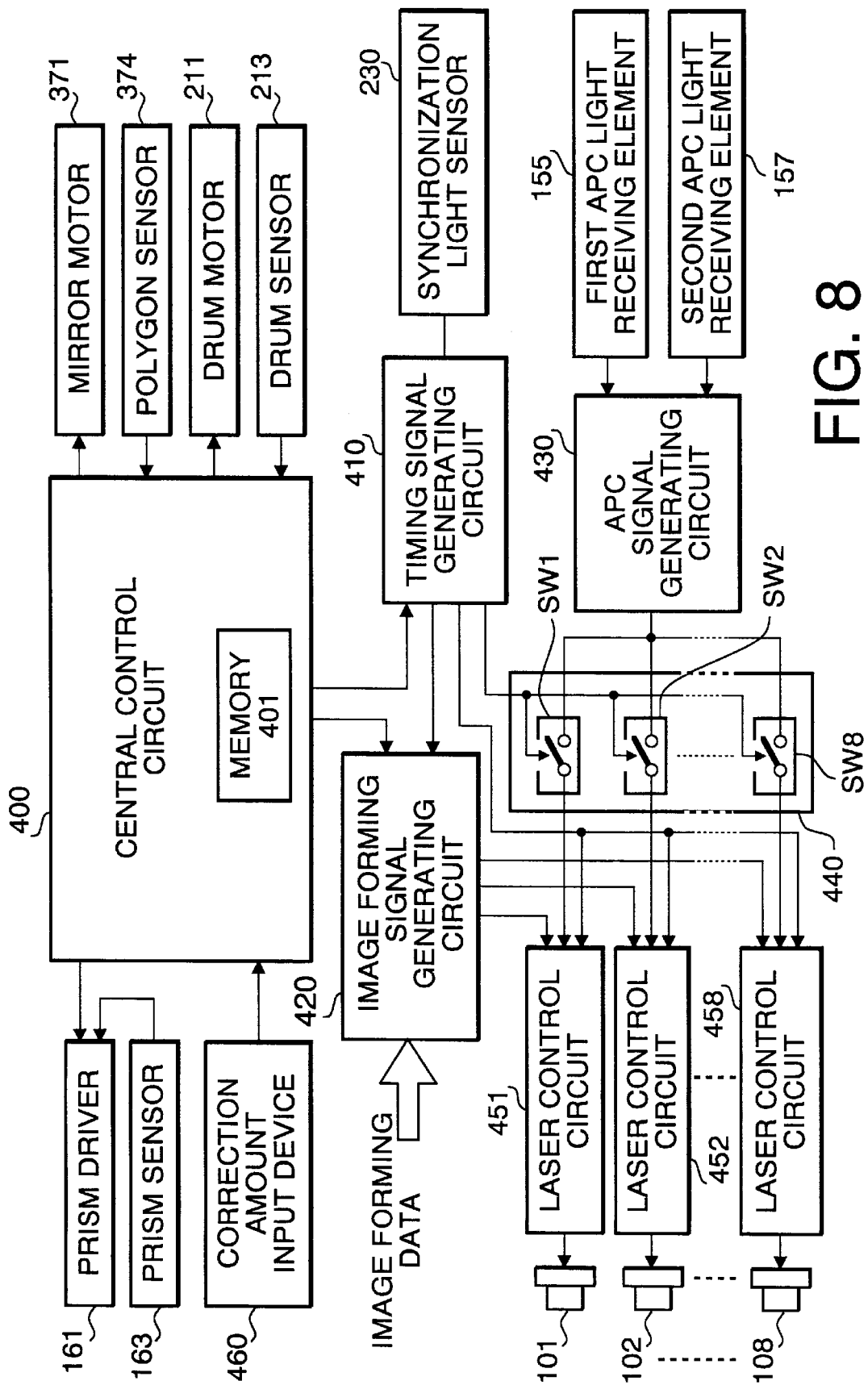
Fig. 8 is a block diagram that illustrates a control system of the scanning optical device.

FIG. 8 is a block diagram showing a control system of the scanning optical device. The control system includes a central control circuit 400 which controls the entire device; a timing signal generating circuit 410 for generating timing signals per scan for setting and image forming; an image forming signal generating circuit 420 for converting image data to image forming signals (for example, image dot data per scan) and outputting the same; and laser control circuits 451 through 458 for driving and controlling the semiconductor lasers 101 through 108 on the basis of the respective image forming signals. The control system further includes an APC (automatic power control) signal generating circuit 430 for generating APC signals on the basis of the output of the first and second light receiving elements 155 and 157; and a switching circuit 440 for distributing the detected APC signals to the respective laser control circuits 451 through 458.

The central control circuit 400 drives the mirror motor 371 to rotate the polygonal mirror 180, and further drives the drum motor 211 to rotate the photoconductive chum 210 at a fixed speed. The central control circuit 400 identifies which reflecting surface of the polygonal mirror is currently scanning the laser flux on the basis of the index signals from the polygon sensor 374 and horizontal synchronization pulses (HS), generated for each scan by detecting a signal output from the synchronization light sensor 230. In this case, because a single mark M is made on the polygon mirror 180, first a reflecting surface that corresponds to the mark M is identified by detecting the mark M. Thereafter, reflecting surfaces are identified by cyclically counting the number of horizontal synchronization pulses received between the detection of the mark M.

Alternatively, the central control circuit 400 could also identify the reflecting surface that is currently deflecting the light beam by dividing the time interval between index signals by the number of reflecting surfaces.

The central control circuit 400 also detects the rotation speed of the photoconductive drum 210 based on detection signals received from a drum sensor 213 (shown only in FIG. 8) and detecting temporal unevenness of the rotation.

As described above, since facial errors (shape errors) of the polygonal mirror 180 and rotation unevenness of the photoconductive drum 210 appear as shifts in the auxiliary scanning direction of the beam spots at the drum 210, the angle of the dynamic prism 160 is changed to correct the influence of the error and unevenness of rotation. The amount of beam spot shifting on the photoconductive drum due to facial errors (i.e., inclinations) of each surface of the polygonal mirror 180 is measured for each of the reflecting surfaces and stored into a memory 401 during manufacturing. The central control circuit 400 determines the adjusting angle to which the dynamic prism 160 must be moved to counterbalance the shifting of the beam spots for each reflection surface according to the data in the memory 401 and the index signal.

Accordingly, the angle of the dynamic prism 160 for each reflecting surface of the polygonal mirror is set by controlling prism drive portion 161 on the basis of at least the compensation angle. The adjusting angle of the dynamic prism 160 is detected by prism sensor 163, and the prism drive portion 161 controls the dynamic prism 160 in a closed loop based on at least the output of the sensor 163. Since the shifting of the beam spots due to facial errors (such as inclination) is known for each reflection surface, the adjusting angle is a reference adjusting angle of the dynamic prism 160 with respect to the corresponding reflection surface.

The amount of shift of a beam spot on the photoconductive drum 210 based on the tilt error of each reflecting surface of the polygon mirror 180 can be determined by calculation after either independently measuring the tilt angle of each reflecting surface or actually measuring the differences among the respective reflecting surfaces for a beam spot of a predetermined image height made on the photoconductive drum 210 or an optically equivalent surface. The correction data that have been determined are input into the central control circuit 400 using a correction amount input device 460 and stored in the memory 401. Since the correction amount input device 460 is only needed during the adjustment stage, the correction amount input device 460 can be removed after the correction data have been input into the memory 401.

Conversely, since unevenness in the rotation of the photoconductive drum 210 is not a periodic error, but rather is generated at random, the central control circuit 400 controls the prism drive portion 161 to counterbalance the detected shifting of the beam spots (generated from the rotation unevenness) based on the output of the drum sensor 213. The compensation of the deviation of the beam spot due to the unevenness of the rotation of the photoconductive drum 210 is effective when the average rotation speed is constant. That is, if the rotation speed is lower than a reference speed during a predetermined period, it must be higher than the reference speed during another period. The requirement of average rotation speed is necessary because the adjustable range of the dynamic prism is limited to a predetermined amount, and, if the deviation amount accumulated, there would be some point at which the deviation could not be compensated by the adjustment by the dynamic prism 160.

Since the relationship between the adjusting angle of the dynamic prism 160 and the movement of the beam spot is non-linear, it is impossible to independently calculate a first adjusting angle to correct the shift due to the facial inclination, and another adjusting angle to correct the shift due to rotation unevenness. Therefore, the central control circuit 400 synthesizes an amount of beam spot shifting by adding the amount of shifting of the beam spot due to facial inclination on the corresponding reflection surface to the amount of shifting of the beam spot due to the rotation unevenness. The adjusting angle of the dynamic prism 160 to counterbalance the synthesized amount of shifting of the beam spot is obtained thereby, and the prism drive portion 161 is controlled according to the synthesized amount of shifting.

Thus, even though the position of the scanning lines in the auxiliary scanning direction cannot be completely corrected by a combination of the cylindrical lens 170 and the fθ lens 190, with the above control it is possible to accurately control the position of the scanning lines in the auxiliary scanning direction.

Although only shifts in the auxiliary scanning direction were subjected to correction in the present example, variations in the scanning speed of a beam spot due to curvature of the reflecting surfaces of the polygon mirror 180 in the main scanning direction may also be corrected for. In such an arrangement, the dynamic prism 160 could be disposed so as to rotate about an axis parallel to the auxiliary scanning direction, and thus control the position of the beam spot in the main scanning direction.

Such an arrangement may be necessary since the curvature of a reflecting surface in the main scanning direction also generally differs for each reflecting surface. In a similar way to that described above for the auxiliary scanning direction, the amount that a beam spot is shifted due to the curvature varies according to the scan position in the main scanning direction. Thus, correction amounts (correction data) for each scan position in the main scan can be stored in memory 401 for each reflecting surface. Then, for correction, the reflecting surface that is currently deflecting the light flux is identified based on the index signal output from the polygon sensor 374 and the synchronizing signal output on each scan from the synchronization light sensor 230, and the scan position is determined according to the time from the rise of the synchronizing signal, such that the correction amount for the scan-position and reflecting surface concerned is read out from the memory 401, and the dynamic prism 160 is rotated to correct the position of the beam spot in the main scanning direction.

The timing signal generating circuit 410 generates three timing signals when the current scanning reflection surface of the polygonal mirror 180 changes to the next reflection surface.

The first timing signal is output to each of the laser control circuits 451 through 458 and to the switching circuit 440, and controls each of the semiconductor lasers 101 through 108 to independently emit light one after another in order to obtain the APC signals. The APC signal generating circuit 430 detects the output of each of the sequentially driven semiconductor lasers 101 through 108 from the first and second light receiving elements 155 and 157, and outputs APC signals for every semiconductor laser 101 through 108. The switching circuit 440 selects an output address, switching the APC signals output from the APC signal generating circuit 430 to the corresponding laser drive circuit in compliance with the first timing signal. For example, a switch SW1 is closed for a fixed period of time as the first semiconductor laser 101 is emitting light, and the APC signals output at this time are input in the first laser control circuit 451, similarly for the second semiconductor laser 102, switch SW2, and second laser control circuit 452, and so on. The respective laser control circuits 451 through 458 control the gain on the basis of the input APC signals to control the output of the semiconductor lasers to a reference level.

The second timing signal is output to each of the laser control circuits 451 through 458, and controls all of the semiconductor lasers 101 through 108 to emit light simultaneously to provide a horizontal synchronization signal. Since the main flux incident into the synchronization light sensor 230 from the semiconductor lasers 101 through 108 includes eight light fluxes separated from each other in the main scanning direction, the eight light fluxes reach the synchronization light sensor 230 from each of the semiconductor lasers 101 through 108 in sequence (i.e., according to different timing, although close together).

The third timing signal is output to the image forming signal generating circuit 420, and is the horizontal synchronization pulse (HS), generated per scanning line by detecting a signal output from the synchronization light sensor 230. A predetermined duration after the input of respective horizontal synchronization pulses from the synchronization light sensor 230 the image forming signal generating circuit 420 supplies image forming signals to each of the laser control circuits 451 through 458, to begin image forming.

In FIG. 8, the APC signal generating circuit 430 amplifies, by a predetermined proportion, the outputs of the first and second APC light receiving elements 155 and 157. As explained above, the first and second APC light receiving elements 155 and. 157, respectively, receive the two linearly polarized components that have been separated by the polarization beam splitter 153, and adds the outputs to determine and output the APC signal.

Upon input of the first timing signal from the timing signal generating circuit 410, the laser driving circuits 451 to 458 synchronize with the turning ON of each switch SW1 to SW8 and receive the APC signal output from the APC signal generating circuit 430, calculate the difference between the APC signal and the reference voltages corresponding to the predetermined reference outputs of the semiconductor lasers, and set the gain by means of the resulting differential signals.

The driving signals of the laser driving circuits 451 to 458 for the image forming process are adjusted by the set gains, (based on the differential signals). The outputs of the semiconductor lasers 101 to 108 are thus controlled by the above arrangement so that the intensity of the beam spots on the surface of the photoconductive drum 210 will be at a reference level.

Although the structure and operation of a scanning optical device and polygon mirror cover are described herein with respect to the preferred embodiments, many modifications and changes can be made without departing from the spirit and scope of the invention.

The present disclosure relates to subject matter contained in Japanese Patent Application Nos. HEI 8-037266, filed on Jan. 31, 1996, and HEI 8-040604, filed on Feb. 2, 1996, which are expressly incorporated herein by reference in their entirety.

What is claimed is:

1. A scanning optical device, comprising:
    a light source that emits a light flux;
    a polygon mirror that includes a plurality of reflecting surfaces for deflecting said light flux to form a scanning beam spot on an image surface, said polygon mirror including a mark on a top surface of said polygon mirror eccentric from a rotation axis of said polygon mirror;
    a polygon mirror cover that covers said polygon mirror, said polygon mirror cover comprising a cylindrical wall that surrounds said reflecting surfaces, a top wall that closes one end of said cylindrical wall to cover said top surface of said polygon mirror, and a cylindrical rib having a smaller diameter than said cylindrical wall formed on an inner surface of said top wall projecting toward said polygon mirror; and
    an optical sensor that detects said mark, said optical sensor being fixed to said top wall and projecting toward said polygon mirror from said inner surface of said top wall, through said cylindrical rib, such that said optical sensor forms a part of said cylindrical rib.

2. The scanning optical device according to claim 1, wherein said cylindrical wall is formed with a light path hole which transmits light flux incident on and reflected from said polygon mirror.

3. The scanning optical device according to claim 2, wherein a cover glass plate is fitted in said light path hole.

4. The scanning optical device according to claim 3, wherein said cover glass plate is tilted at a predetermined angle in an auxiliary scanning direction with respect to an axis of the incident light flux.

5. The scanning optical device according to claim 1, further comprising a dynamic prism that is disposed between said light source and said polygon mirror, and a driving mechanism that rotates said dynamic prism to change the angle of said dynamic prism to control the position of the beam spot on said image surface during scanning.

6. The scanning optical device according to claim 5, wherein an output of said optical sensor is used to control a driving mechanism.

7. The scanning optical device according to claim 1, further comprising a scanning lens disposed between said polygon mirror and said image surface to converge said light flux deflected by said polygon mirror.

8. The scanning optical device according to claim 1, wherein said light source emits a plurality of light fluxes.

9. A polygon mirror cover having a cup shape, comprising:
    a cylindrical side wall portion that surrounds a plurality of reflecting surfaces of a polygon mirror, wherein an optical path hole is formed on said side wall portion;
    a flat top wall portion that covers one opening of said side wall portion, wherein a sensor hole is formed away from a rotational axis of said polygon mirror; and
    a cylindrical rib that is formed on the inner surface of said top wall portion to project toward said polygon mirror such that an optical sensor inserted in said sensor hole is essentially flush with said cylindrical rib.

* * * * *